US011328532B2

(12) United States Patent
Harris

(10) Patent No.: US 11,328,532 B2
(45) Date of Patent: May 10, 2022

(54) MASK AWARE BIOMETRIC IDENTIFICATION SYSTEM

(71) Applicant: Scott C Harris, San Diego, CA (US)

(72) Inventor: Scott C Harris, San Diego, CA (US)

(*) Notice: Subject to any disclaimer, the term of this patent is extended or adjusted under 35 U.S.C. 154(b) by 59 days.

(21) Appl. No.: 15/929,266

(22) Filed: Apr. 20, 2020

(65) Prior Publication Data

US 2021/0326579 A1    Oct. 21, 2021

(51) Int. Cl.
*G06V 40/16* (2022.01)
*G06F 21/32* (2013.01)

(52) U.S. Cl.
CPC ........... *G06V 40/172* (2022.01); *G06F 21/32* (2013.01); *G06V 40/165* (2022.01); *G06V 40/171* (2022.01); *G06F 2221/2105* (2013.01)

(58) Field of Classification Search
CPC ........... G06K 9/00288; G06K 9/00281; G06K 9/00228; G06K 9/00268; G06K 9/00221; G06K 9/00248; G06K 9/00255; G06K 9/00302; G06K 9/0061; G06T 2207/30201; G06F 21/32; G06F 2221/2105; H04N 5/23219
See application file for complete search history.

(56) References Cited

U.S. PATENT DOCUMENTS

| | | | |
|---|---|---|---|
| 2009/0110248 A1* | 4/2009 | Masuda | G06F 21/32 382/118 |
| 2010/0183218 A1* | 7/2010 | Naito | G06K 9/00281 382/159 |
| 2013/0024932 A1* | 1/2013 | Toebes | H04W 12/08 726/19 |
| 2013/0163829 A1* | 6/2013 | Kim | G06K 9/00 382/118 |
| 2013/0243274 A1* | 9/2013 | Sukegawa | G06K 9/00221 382/118 |
| 2013/0247175 A1* | 9/2013 | Nechyba | G06F 21/32 726/19 |
| 2016/0100314 A1* | 4/2016 | Chung | H04W 12/06 713/186 |
| 2017/0124383 A1* | 5/2017 | Ohbitsu | G06K 9/00268 |
| 2018/0373924 A1* | 12/2018 | Yoo | G06F 21/32 |
| 2020/0042770 A1* | 2/2020 | Yan | G06T 7/11 |

* cited by examiner

*Primary Examiner* — Edward F Urban
*Assistant Examiner* — Wassim Mahrouka
(74) *Attorney, Agent, or Firm* — Law Office of Scott C Harris, Inc

(57) ABSTRACT

A face identification system detects that a user is wearing a facemask, by finding an area on the face image which has no facial recognition facial features, and that area is a continuous area and includes the nose and mouth of the user, being covered by the mask. Responsive to making this detection, the system determines that the user is wearing a facemask and carries out a facemask recognition operation. The facemask recognition operation can include finding some other way to verify the user, or reducing security so that the user can be verified while still wearing the facemask.

14 Claims, 2 Drawing Sheets

MASK AWARE BIOMETRIC IDENTIFICATION SYSTEM

BACKGROUND

A conventional way of carrying out biometric identification often uses face ID to recognize a person's face. The system operates by using a camera to determine size, kind and location of facial features on the face, and comparing those against a reference taken from the authorized user's face. This recognition is used to determine whether the person is actually authorized to access various resources on a computer or cell phone. For example, Apple, Microsoft and others use face ID, to only allow an authorized user to get access to computer resources.

A conventional face ID system uses a camera 100 such as shown in FIG. 1 to image the face 110 of a person. The camera is connected to a computer 105 which can be any kind of computer, including a desktop computer, portable computer such as a cell phone or tablet, or a thin computer which carries out its processing on a network-based computer resources.

In many applications, the computer 105 will have the camera 100 built into the computer such as a cell phone camera.

In operation, the computer obtains one or more images of the user's face, and analyzes an image to find facial features in the image. Facial features can include location, size, type and orientation of eyes, nose, mouth, hairline, head shape, ears, and any other face image.

The computer determines facial features and vectors representing the facial features. The vectors, such as 111 112, 113 represent vectors that are defined between different facial features on the users face. One such vector, for example, can be the distance between the eyes. Other vectors, however, can be location of the ears, size of the nose, size of the mouth, face shape, as well as various other parameters. The system can use the determination of these facial features to compare against features in a database. Based on this detection, the system identifies whether the user is an authorized individual, and if so, grants them access, e.g. to the unlocked cell phone and/or other computer resources.

This is conventionally done by comparing multiple different features of the face to multiple different features in a face that was learned during a learning phase of the biometric routing.

SUMMARY

The outbreak of the coronavirus-19 pandemic has led to a situation where people have been urged to wear facemasks when in public. It is believed that facemasks may be necessary for the foreseeable future. Even before the coronavirus pandemic, it had been becoming stylish in many countries to wear facemasks in public.

The inventor recognized, however, that a facemask covers a large portion of the face, and hence interferes with the face recognition system's ability to carry out biometric face recognition. The user then must either use an alternative form of recognition such as a passcode (which requires a user to remove their gloves if so wearing), or remove the mask from their face in public, which defeats the entire purpose of wearing a mask.

The present invention describes using the face recognition computer to detect that a mask is being worn by a user, and to allows the routine to take actions responsive to that detection, so that when the user is wearing a mask, the computer, (which in an embodiment can be a cell phone) can still carry out automatic biometric recognition.

BRIEF DESCRIPTION OF THE DRAWINGS

These and other aspects will now be described with reference to the accompanying drawings wherein.

DETAILED DESCRIPTION

Figure 1:
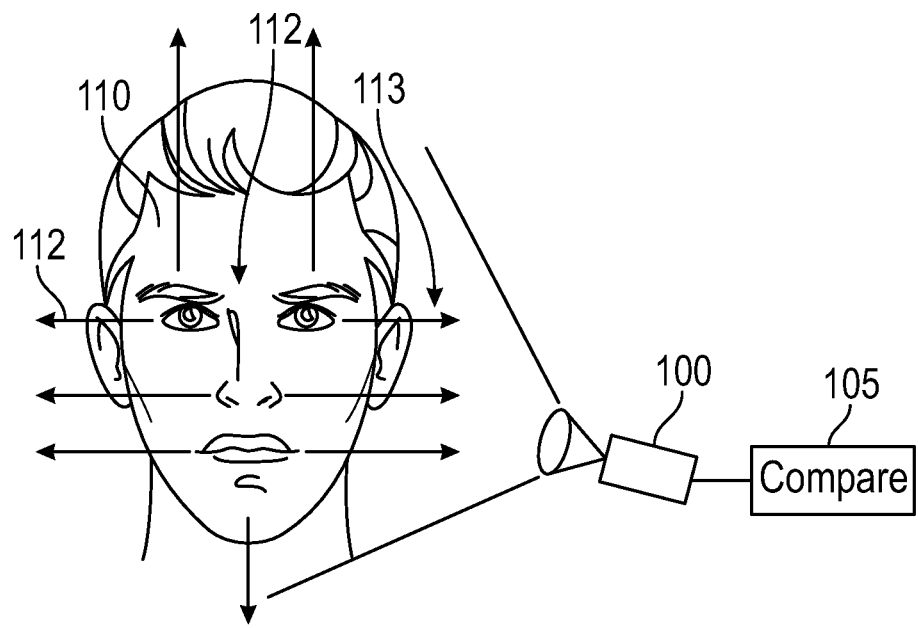
FIG. 1 shows a prior art version of a system for carrying out face recognition.
Figure 2:
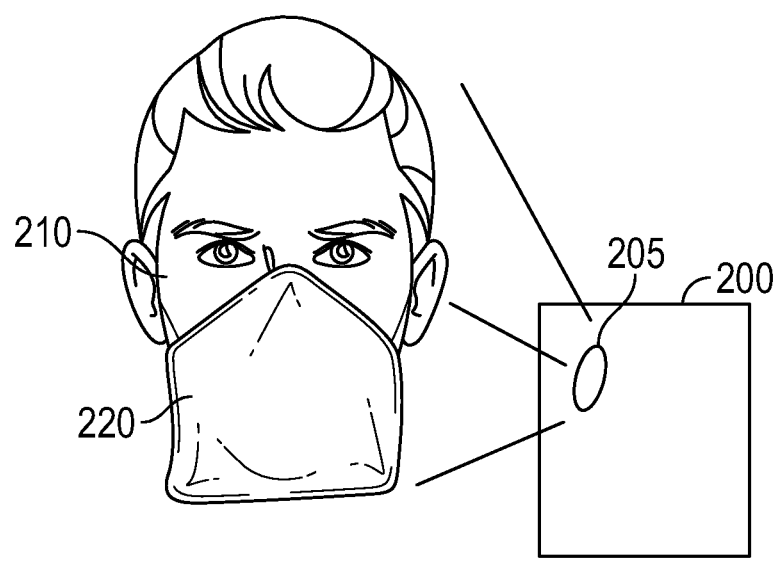
FIG. 2 shows a system for carrying out mask recognition and using that recognition to modify the usual face recognition operation.

FIG. 2 shows an embodiment, where a cell phone 200 includes a camera 205 that is imaging the face 210 of the user. In this embodiment, the user is wearing a mask 220. The cell phone carries out a process to obtain facial features of the user's face and compare the facial features against a prestored pre-authorized face image. The cell phone may carry this out by executing steps on the cell phone, or by sending information to a remote network process.

Figure 3:
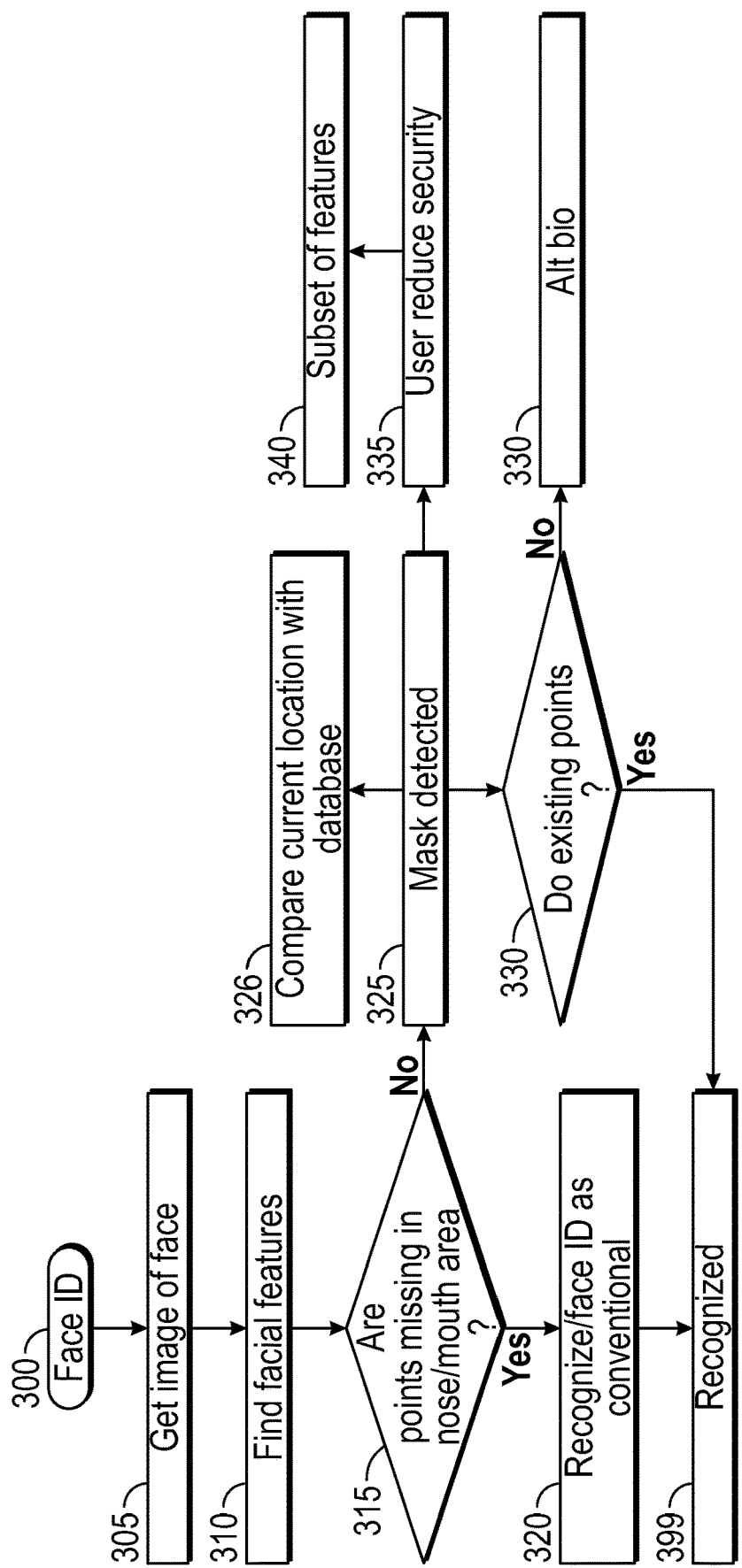
FIG. 3 shows a flowchart of operation of the modified face recognition system.

FIG. 3 illustrates a flowchart of the face ID operation, being executed by a processor that is carrying out the face ID operation.

At 305, the camera 205 obtains an image of the user's face. At 310, that image is analyzed, by finding facial features in the image. For example, and without limiting this disclosure, this may find facial features that represent the distance between, location of, size of, shape of, and orientation of, the user's: eyes, nose, forehead, mouth, cheeks, face perimeter, ears, and hairline. All of these facial features, which can be points, vectors, images, angles or other measures, are collectively included within the points and vectors that are found at 310.

At this point, once all these facial features are found, 315 analyzes the image to determine whether there is an area of facial features which are missing in the image, and specifically an area of facial features around the nose and mouth area. For example, in FIG. 2, the entire area around 220 would be missing facial features. There may be features found, especially if the mask is made of a material with a pattern, but the features will not be facial features, that is, they will not be features of a face such as discussed above, because the user is wearing a facemask that covers the user's nose and mouth.

This recognizes that a facemask is used to cover the nose and mouth, and hence an area around that nose and mouth will have no facial features. Also, the facemask is typically a piece of material and hence forms a continuous area where no such facial features are found.

At 315, if the facial features are not missing in the nose and mouth area, the system proceeds to recognize and carry out face ID as conventional at 320. However, if points are missing at 315, this establishes, at 325, that a mask has been detected.

The mask detection causes the system to carry out a mask detection recognition routine. This routine can modify the usual face recognition in a number of different ways.

A first technique of compensating for the facemask detects at 330, whether the existing facial features sufficiently define a biometric match even though the other points are missing. For example, it may be necessary to verify 16, 20, or 25 points in order to carry out a biometric verification. The system may conventionally require that these points be spaced at areas around the face. However, once a mask is detected, the system can re-analyze at 330 whether the existing points which have been detected are of a sufficient number, to establish a biometric verification. If so, then the face is recognized at 399 and access is given to the resources of the computer.

If the existing points do not define a sufficient universe to recognize the face at 325, or alternatively, if the user has turned off this option, then the system may request an alternative biometric at 330. For example, this may request the user to put their finger on the screen of the cell phone, or to take a picture of some other biometric features such as the ear, or the like to obtain additional biometric information.

Other ways of detecting the additional biometric information are also possible.

Another embodiment, however, is that the user can reduce the security to their cell phone when a mask is detected. This is shown at 335. While this is shown as being carried out in response to a mask been detected, the user can also simply enable this option prior to the detection, with an option such as "always reduce security when a face mask is detected".

When the mask is detected at 325, the system can signal to the user, either by message or out loud "a mask has been detected, do you want to reduce security on your phone?". The user then will need to enter a passcode code or some other means of telling the phone that the user answering the question is actually authorized. However, answering yes, causes the security routine can be reduced in severity for some period of time, or until the user leaves some area.

This reduced security mode, for example, can verify the face using only matching of the facial features outside the mask area.

After reducing the security, the system may grant access, in one embodiment, only to some subset of phone features; for example, it may grant access only to communication features, but not to any financial features or access to a cryptographic authenticator on the phone, or toother features which require heavy heavier security such as bank accounts, or carrying out transactions, or the like.

This enables, for example, the user to use their cell phone for things like lists. When shopping in a grocery store, the user can use their cell phone to read from a shopping list. Rather than having to take their mask off every time they need to access the list, they can put the phone into the reduced security mode at 335, in which they receive a subset of features at 340. The subset of features, for example may include access to the notes, or to grocery list applications or grocery store applications. However, the user will not be able to use their phone in this embodiment to pay for their groceries, requiring that they do something else in order to pay. The user will need to carry out a higher security operation in order to make a payment.

In another embodiment, when the facemask is determined, the location is automatically obtained and compared with a database of locations where the user might need to wear a facemask. For example, users might be forced to wear facemasks in grocery stores and restaurants. In one embodiment, responsive to the facemask determination at 325, an additional step may be carried out at 326 to compare the current location with a database that contains locations where user might be likely to wear a facemask, such as grocery stores, restaurants and other public places. The user or the system may then automatically reduce security according to any of the other security reduction techniques described herein if the user is within a location where facemask wearing is likely. In this embodiment, the security reduction technique can automatically terminate when the user leaves the area, e.g., leaves the grocery store.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A face recognition system comprising:
    a computer running a routine which receives an image of a user's face, and processes the image to find facial features on the user's face;
    the computer determining whether an area of the users face around a nose and mouth has no facial features;
    responsive to determining no facial features in the area of the users face around the nose and mouth, determines that the user is wearing a facemask; and
    the computer running a facemask routine responsive to determining that the user is wearing a facemask, where the facemask routine enables an alternative mode of recognizing the user's face relative to a reference image of the users face, where the facemask routine allows the user's face to be recognized as authorized even while the user is wearing the facemask, wherein the alternative mode of determining the users face comprises reducing security by recognizing only the part of the face which is not covered by the facemask, and further comprising using the computer for prompting the user to determine if the user is willing to reduce security.

2. The system as in claim 1, further comprising responsive to determining facial characteristics in the area of the users face around the nose and mouth, the computer recognizing the user's face using a conventional face recognition technique using facial characteristics found in all the areas of the user's face.

3. The system as in claim 1, wherein the system provides access to resources of the computer responsive to the reducing security, wherein the system provides access to only some resources of the computer responsive to the reducing security, where the only some resources of the computer which receive access include resources that do not require a financial transaction.

4. The system as in claim 1, wherein the alternative mode of determining the users face comprises determining whether a number of existing facial features which can be found outside area of the users face around the nose and mouth, matches to a threshold of a number of facial features that are used to establish a biometric match, even though the facial features which are found are outside the area of the users face around the nose and mouth.

5. The system as in claim 1, wherein the alternative mode includes an alternative biometric.

6. The system as in claim 1, wherein the computer is a cellular phone.

7. The system as in claim 1, wherein the facemask routine comprises determining a location of the computer at a time of the running of the routine, determining if the location is one where a user would be likely to be wearing a facemask, and reducing security of a biometric procedure while in the location where the user is likely to be wearing the facemask.

8. The system as in claim 1, wherein the facial features include distance between, location of, size of, shape of, and orientation of, at least multiple of the user's: eyes, nose, forehead, mouth, cheeks, face perimeter, ears, and hairline.

9. A face recognition system comprising:
a computer running a routine which receives an image of a user's face, and processes the image to find facial features on the user's face;
the computer determining whether an area of the users face around a nose and mouth has no facial features;
responsive to determining no facial features in the area of the users face around the nose and mouth, determines that the user is wearing a facemask; and
the computer running a facemask routine responsive to determining that the user is wearing a facemask, where the facemask routine enables an alternative mode of recognizing the user's face relative to a reference image of the users face, where the facemask routine allows the user's face to be recognized as authorized even while the user is wearing the facemask,
wherein the facemask routine comprises determining a location of the computer at a time of the running of the routine, determining if the location is one where a user would be likely to be wearing a facemask, and reducing security of a biometric procedure while in the location where the user is likely to be wearing the facemask, wherein the location where the user is likely to be wearing the facemask comprises public areas where facemask wearing is needed.

10. A face recognition method comprising:
running a routine on a computer which receives an image of a user's face processing the image to find facial features on the user's face;
wherein the processing comprises determining whether there is an area of the user's face surrounding a nose and mouth of a user that has no facial features;
responsive to said determining no facial features in the area of the users face around the nose and mouth, determining that the user is wearing a facemask; and
running a facemask routine responsive to determining that the user is wearing a facemask, where the facemask routine enables an alternative mode of recognizing the user's face relative to a reference image of the users face, where the facemask routine allows the user's face to be recognized as authorized even while the user is wearing the facemask, further comprising responsive to determining facial characteristics in the area of the users face around the nose and mouth, recognizing the user's face using a conventional face recognition technique using facial characteristics found in all the areas of the user's face, wherein the alternative mode of determining the users face comprises reducing security by recognizing only the part of the face which is not covered by the facemask, and further comprising prompting the user to determine if the user is willing to reduce security.

11. The system as in claim 10, wherein the facial features include distance between, location of, size of, shape of, and orientation of, at least multiple of the user's: eyes, nose, forehead, mouth, cheeks, face perimeter, ears, and hairline.

12. The method as in claim 10, further comprising providing access to only some resources of the computer responsive to the reducing security, where the only some resources of the computer which receive access include resources that do not require a financial transaction.

13. The method as in claim 10, wherein the facemask mode comprises determining a location of the computer at a time of the running of the routine, determining if the location is one where a user would be likely to be wearing a facemask, and reducing security of a biometric procedure while in the location where the user is likely to be wearing the facemask.

14. A face recognition method comprising:
running a routine on a computer which receives an image of a user's face and processing the image to find facial features on the user's face;
wherein the processing comprises determining whether there is an area of the user's face surrounding a nose and mouth of a user that has no facial features;
responsive to said determining no facial features in the area of the user's face around the nose and mouth, determining that the user is wearing a facemask; and
running a facemask routine responsive to determining that the user is wearing a facemask, where the facemask routine enables an alternative mode of recognizing the user's face relative to a reference image of the user's face, where the facemask routine allows the user's face to be recognized as authorized even while the user is wearing the facemask,
wherein the facemask mode comprises determining a location of the computer at a time of the running of the routine, determining if the location is one where a user would be likely to be wearing a facemask, and reducing security of a biometric procedure while in the location where the user is likely to be wearing the facemask, wherein the location where the user is likely to be wearing the facemask comprises public areas where facemask wearing is needed.

* * * * *